July 23, 1940.     J. E. OYS     2,208,853
DUSTER
Filed July 11, 1938
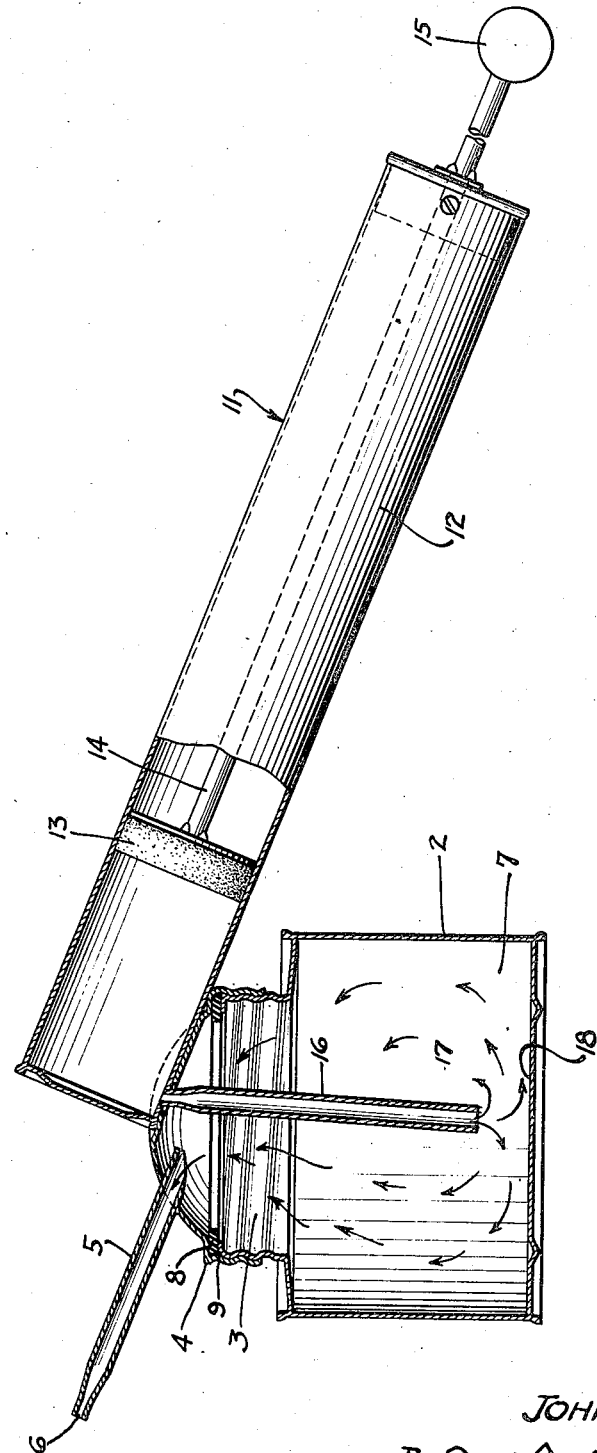
INVENTOR
JOHN E. OYS
By Paul, Paul Moore Hiere
ATTORNEYS Patented July 23, 1940

2,208,853

UNITED STATES PATENT OFFICE 2,208,853

DUSTER

John E. Oys, Hastings, Minn., assignor to H. D. Hudson Manufacturing Company, Chicago, Ill., a corporation of Minnesota Application July 11, 1938, Serial No. 218,574

1 Claim. (Cl. 43—147)

This invention relates to new and useful improvements in dusters and more particularly to such devices adapted for dusting dry insecticide powders onto plants, shrubs, trees, and the like.

Insecticide powders, as is well known, frequently contain what is commonly known as a "carrier." This carrier is a non-poisonous, inexpensive powdered material which is intermixed with the poison powder to increase the volume of insecticide powder, and also for the purpose of controlling the amount of poison delivered onto the plants. Some poison powders are quite expensive, and are very deadly to insects, and as a result, a very light dusting of such powders on the plants is sufficient to accomplish the desired results. To control the amount of poison applied to the plants, the poison powder is intermixed with a non-poisonous powdered material or carrier, as above stated. When a carrier is intermixed with the poison powder, it is essential that it be thoroughly intermixed with the poison powder, so that any powder dusted onto a plant from said device, will be deadly to all insect life. The carrier must therefore be uniformly intermixed with the poison, in order that the resultant powder will serve effectively as an insecticide powder. This has heretofore been rather difficult with the use of ordinary equipment because of the inability of such equipment to thoroughly intermix the poisonous powder with the carrier, primarily because of the carrier having a higher specific gravity.

The novel device herein disclosed, has been designed to eliminate the objections above referred to, and is so constructed that the various ingredients of the finished insecticide powder, such as the poison powder and carrier, are so thoroughly intermixed in the operation of forcing the powder through the usual nozzle of the apparatus onto the plants, that the plants may be substantially uniformly covered with the insecticide powder.

An object of the present invention, therefore, is to provide a duster for applying insecticide powders onto plants, whereby the usual carrier contained in numerous such powders, is thoroughly intermixed with the effective or poisonous powder in the operation of discharging the powder from the device onto the plants.

Other objects of the invention reside in the simple and inexpensive construction of the apparatus, whereby it may readily be manufactured in quantity production at small cost; in the novel arrangement of the discharge tube or pipe of the pump, whereby the air discharging therefrom into the powder reservoir is given a whirling action, whereby the contents of the reservoir is thoroughly agitated and the ingredients thereof intermixed in the operation of forcing the insecticide powder from the reservoir through the usual nozzle thereof; and, in the provision of such an apparatus which is extremely simple to operate.

The accompanying drawing illustrates a sectional view of my improved duster, showing the whirling action imparted to the contents of the reservoir, when the pump is operated to discharge the insecticide from the powder reservoir.

In the selected embodiment of the invention herein disclosed, there is shown, for purposes of disclosure, a duster comprising a container, generally indicated by the numeral 2, having a suitable filler opening 3 provided with a cover 4.

A discharge tube 5 has one end suitably secured to the cover 4 and has its opposite or outer end flattened to provide an elongated discharge opening 6, which serves as a nozzle through which the contents of the container is discharged from the powder reservoir 7. The cover 4 is shown provided with a suitable rubber gasket 8 adapted to engage the annular seat 9 on the container body, thereby to provide a leak-proof joint between these parts.

Means is provided for introducing air under pressure into the powder reservoir 7, and is shown comprising a suitable pump, generally indicated by the numeral 11. This pump comprises a barrel 12 having one end suitably secured to the cover 4, as shown. A piston 13 is provided in the barrel 4 and has a stem 14 provided with a handle 15, whereby the pump may be conveniently operated to force air into the powder reservoir 7.

An important feature of the present invention resides in the unique arrangement of the air discharge of the pump. As shown, this discharge is in the form of a small tube 16 having its upper end communicating with the interior of the pump barrel 12 and its lower end 17 disposed in spaced relation to the bottom wall 18 of the powder reservoir. The lower end of the air discharge tube of the pump is disposed in such a manner that when the pump is operated, the air discharging from the pump will be directed downwardly against the bottom wall 18 of the powder reservoir, thereby imparting a whirling action to the contents of the reservoir, as indicated by the arrows in the drawing, whereby the poisonous powder or material and the usual carrier are thoroughly intermixed so as to provide a uniform mixture, which is forcibly discharged from the nozzle 6 onto the plants, as will readily be understood.

Because of the carrier having a higher specific gravity than the poison powder, it has a tendency to settle to the bottom of the reservoir. By directing the air introduced into the reservoir, downwardly in a direction towards the bottom wall of the reservoir, as herein disclosed, the poisonous powder and carrier are given a whirling action, whereby they are thoroughly intermixed, as hereinbefore stated, before being discharged onto the plants by operation of the pump.

The apparatus is extremely simple, and it is to be noted that no movable parts or mechanism are required to agitate the material, except, of course, the usual reciprocation of the pump piston. The powder reservoir may readily and conveniently be filled by simply removing the cap from the container 2. Because of the unique arrangement of the air discharge tube of the pump, there is no danger of dust getting into the pump during the filling operation or when the pump is in use. The downward direction of the air stream into the reservoir, so thoroughly intermixes the carrier with the poisonous powder, that a uniform coverage of both carrier and poison is assured, when the duster is operated to apply the insecticide to the plants. In most dusters now in common use, the poison powder which is relatively lighter in weight than the carrier, is usually discharged from the powder reservoir before the carrier, which results in the latter part of the dusting operation being more or less ineffective, because of the relatively greater percentage of carrier material.

I claim as my invention:

A duster for dusting onto plants, shrubs, and the like, a dry insecticide powder composed of a relatively fine poisonous powder and a suitable carrier powder, said duster comprising a container for the insecticide powder having a filler opening, a closure for said opening screw threaded to the container body, an elongated tube having one end secured to the closure and being in direct communication with the interior of the container, said tube extending outwardly and upwardly from the closure and having a discharge nozzle at its outer end, a pump barrel having a closed end secured to the closure, the axis of said barrel being offset from the axis of said tube, and being substantially parallel thereto, said pump having a relatively small valveless discharge tube extending downwardly into the container with its lower end terminating short of the bottom wall of the container, and a piston operable in the pump barrel, said pump, when operated, pumping air into the bottom of the container with sufficient velocity to thoroughly intermix the poisonous powder and carrier and to develop a pressure in the container whereby the resultant mixture is forced from the container out through the discharge tube, onto the plants being treated, the relatively long discharge tube facilitating the operation of directing the insecticide powder onto the plants.

JOHN E. OYS.